United States Patent
Daito

(10) Patent No.: US 11,358,546 B2
(45) Date of Patent: Jun. 14, 2022

(54) SEMICONDUCTOR DEVICE, ELECTRONIC CONTROL UNIT, VERIFICATION METHOD OF ELECTRONIC CONTROL UNIT AND MANUFACTURING METHOD OF ELECTRONIC CONTROL UNIT

(71) Applicant: RENESAS ELECTRONICS CORPORATION, Tokyo (JP)

(72) Inventor: Masayuki Daito, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 412 days.

(21) Appl. No.: 16/676,047

(22) Filed: Nov. 6, 2019

(65) Prior Publication Data
US 2020/0189497 A1 Jun. 18, 2020

(30) Foreign Application Priority Data
Dec. 18, 2018 (JP) .............................. JP2018-236819

(51) Int. Cl.
| | |
|---|---|
| G06F 9/46 | (2006.01) |
| B60R 16/023 | (2006.01) |
| G05B 13/02 | (2006.01) |
| G06F 9/48 | (2006.01) |

(52) U.S. Cl.
CPC ........ B60R 16/0231 (2013.01); G05B 13/021 (2013.01); G06F 9/4881 (2013.01)

(58) Field of Classification Search
CPC .................................................. G06F 9/4881
USPC ...................................................... 718/102
See application file for complete search history.

(56) References Cited

U.S. PATENT DOCUMENTS

| | | | | |
|---|---|---|---|---|
| 7,603,566 B2 * | 10/2009 | Hashimoto | ........... | G06F 21/123 |
| | | | | 713/168 |
| 8,776,072 B2 * | 7/2014 | Kishita | ................. | G06F 9/4881 |
| | | | | 718/103 |
| 10,522,961 B2 * | 12/2019 | Tokunaga | .............. | H01R 43/28 |
| 10,643,403 B2 * | 5/2020 | Madison | ................. | G07C 5/12 |
| 10,776,169 B2 * | 9/2020 | Teshler | ................... | G06F 21/53 |

(Continued)

FOREIGN PATENT DOCUMENTS

JP       2012-114724 A       6/2012

OTHER PUBLICATIONS

Beckert Matthias et al., "Exploiting sporadic servers to provide budget scheduling for ARINC653 based real-time virtualization environments", Design, Automation & Test in Europe Conference & Exhibition, EDAA, Mar. 27, 2017 (Mar. 27, 2017), pp. 870-875.

(Continued)

*Primary Examiner* — Mehran Kamran
(74) *Attorney, Agent, or Firm* — McDermott Will & Emery LLP

(57) ABSTRACT

A semiconductor device includes an operation resource which performs a plurality of ECU functions, a peripheral resource which is shared by the plurality of ECU functions and a control mechanism which controls a period in which one of the ECU functions uses the peripheral resource. The control mechanism calculates, based on a budget value which is given in advance and is a performance allocation, a use prohibition period in which the one of the ECU functions is prohibited from using the peripheral resource within the predetermined unit time.

8 Claims, 13 Drawing Sheets

(56) References Cited

U.S. PATENT DOCUMENTS

| | | | | |
|---|---|---|---|---|
| 2004/0210903 | A1* | 10/2004 | Kosanovic | G06F 9/5011 |
| | | | | 706/8 |
| 2013/0254592 | A1* | 9/2013 | Yamada | G06F 11/1691 |
| | | | | 714/10 |
| 2019/0266017 | A1* | 8/2019 | Nakamura | G06F 13/4204 |
| 2019/0361736 | A1* | 11/2019 | Poledna | G06F 9/5077 |
| 2020/0081737 | A1* | 3/2020 | Peter | G06F 9/485 |
| 2021/0019170 | A1* | 1/2021 | Sugano | G06F 9/45558 |
| 2021/0358025 | A1* | 11/2021 | Rosekrans | G07C 5/008 |
| 2021/0406065 | A1* | 12/2021 | Liu | G06N 20/00 |
| 2022/0012092 | A1* | 1/2022 | Rieger | G06F 9/4812 |

OTHER PUBLICATIONS

Thomas Nolte et al., "A Synchronization Protocol for Temporal Isolation of Software Components in Vehicular Systems", IEEE Transactions on Industrial Informatics, IEEE Service Center, vol. 5, No. 4, Oct. 13, 2009 (Oct. 13, 2009), pp. 375-387.
Extended European Search Report issued in corresponding European Patent Application No. 19211093.0-1224, dated May 13, 2020.

* cited by examiner

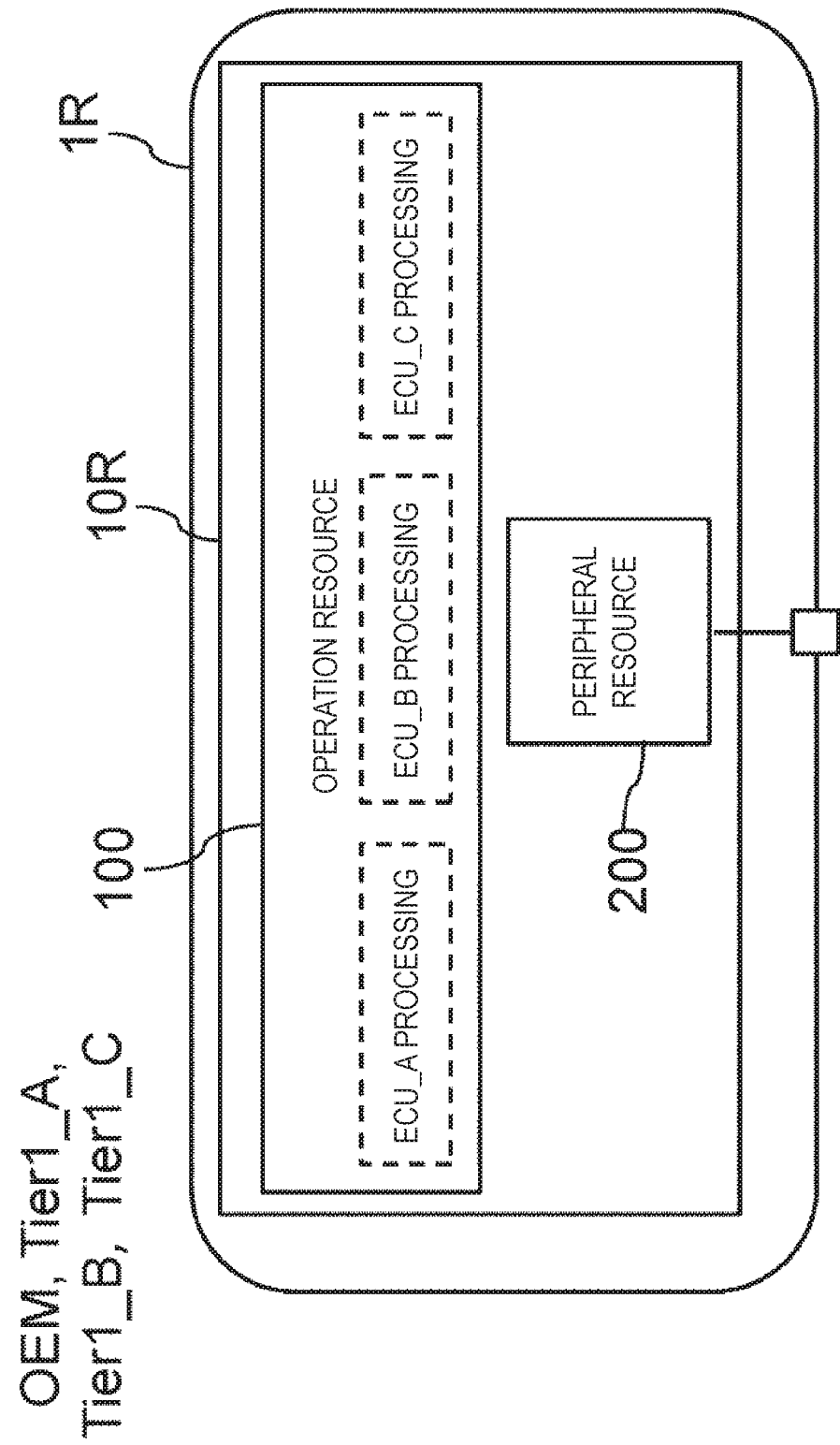

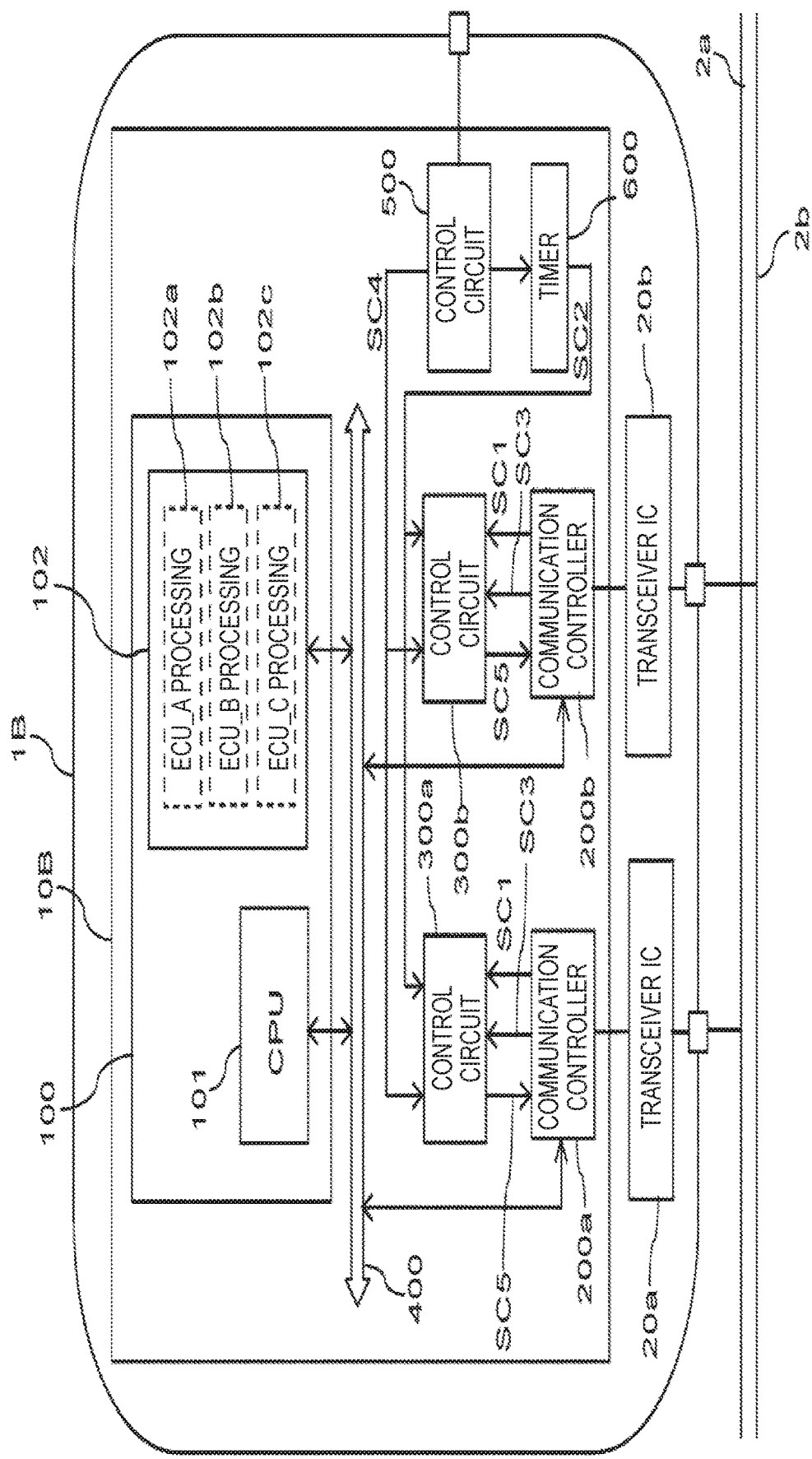

SEMICONDUCTOR DEVICE, ELECTRONIC CONTROL UNIT, VERIFICATION METHOD OF ELECTRONIC CONTROL UNIT AND MANUFACTURING METHOD OF ELECTRONIC CONTROL UNIT

CROSS-REFERENCE TO RELATED APPLICATIONS

The disclosure of Japanese Patent Application No. 2018-236819 filed on Dec. 18, 2018 including the specification, drawings and abstract is incorporated herein by reference in its entirety.

BACKGROUND

The present disclosure relates to a semiconductor device, and is applicable to a semiconductor device used, for example, in an Electronic Control Unit (ECU).

Vehicles such as passenger cars, trucks, and buses are equipped with a large number of ECUs. Each ECU is interconnected and cooperates via an in-vehicle network. In-vehicle electronic architectures are becoming increasingly complex. To solve this problem, simplification of in-vehicle networks and integration of ECUs have been adopted as solutions for cost reduction in the entire in-vehicle electronic architecture (for example, Japanese unexamined Patent Application publication No. 2012-114724).

SUMMARY

Individual systems (ECUs) subject to functional integration are developed and verified by different companies (Tier1) due to the business form. Here, the Tier1 is a primary supplier (primary subcontractor) that delivers products directly to a manufacturer. Thereafter, the vehicle is assembled by a vehicle manufacturer (hereinafter referred to as "OEM") that is in charge of vehicle assembly. At this time, the verification of the portion relating to the connection of each "individual system" is performed, and the verification of the function as a whole is completed. This is because the independence of "individual systems" is self-evident.

On the other hand, it is expected that "systems" developed as "individual systems" will be integrated, but this integration also requires that the functions defined and verified as "individual systems" are reliably realized.

Each Tier1 develops and verifies software that implements the ECU functions for which it is responsible using the hardware of the integrated ECU. The integrated ECU may be composed of a plurality of operation resources corresponding to a single ECU function and a peripheral resource shared by the plurality of operation resources. In this case, each operation resource cannot occupy the peripheral resource, and the use is limited.

However, at the time of verification of the single ECU function in the integrated ECU, the peripheral resource is occupied, and the respective Tier1 cannot verify the single ECU function in the integrated state. Other objects and new features will be apparent from the description of this specification and the accompanying drawings.

One typical aspect of the present disclosure will be briefly described below. A semiconductor device includes an operation resource which performs a plurality of ECU functions, a peripheral resource which is shared by the plurality of ECU functions, and a control mechanism which controls a period in which one of the ECU functions uses the peripheral resource. The control mechanism calculates, based on a budget value which is given in advance and is a performance allocation, a use prohibition period in which the one of the ECU functions is prohibited from using the peripheral resource within a predetermined unit time.

According to the above semiconductor device, the single ECU function can be verified in the integrated state.

BRIEF DESCRIPTION OF THE DRAWINGS

FIG. 2B is a block diagram explaining verification of the integrated ECU of FIG. 1B by the OEM and the Tier1.

FIG. 11 is a diagram schematically showing a configuration of an integrated ECU of a modification.

DETAILED DESCRIPTION

Figure 1A:
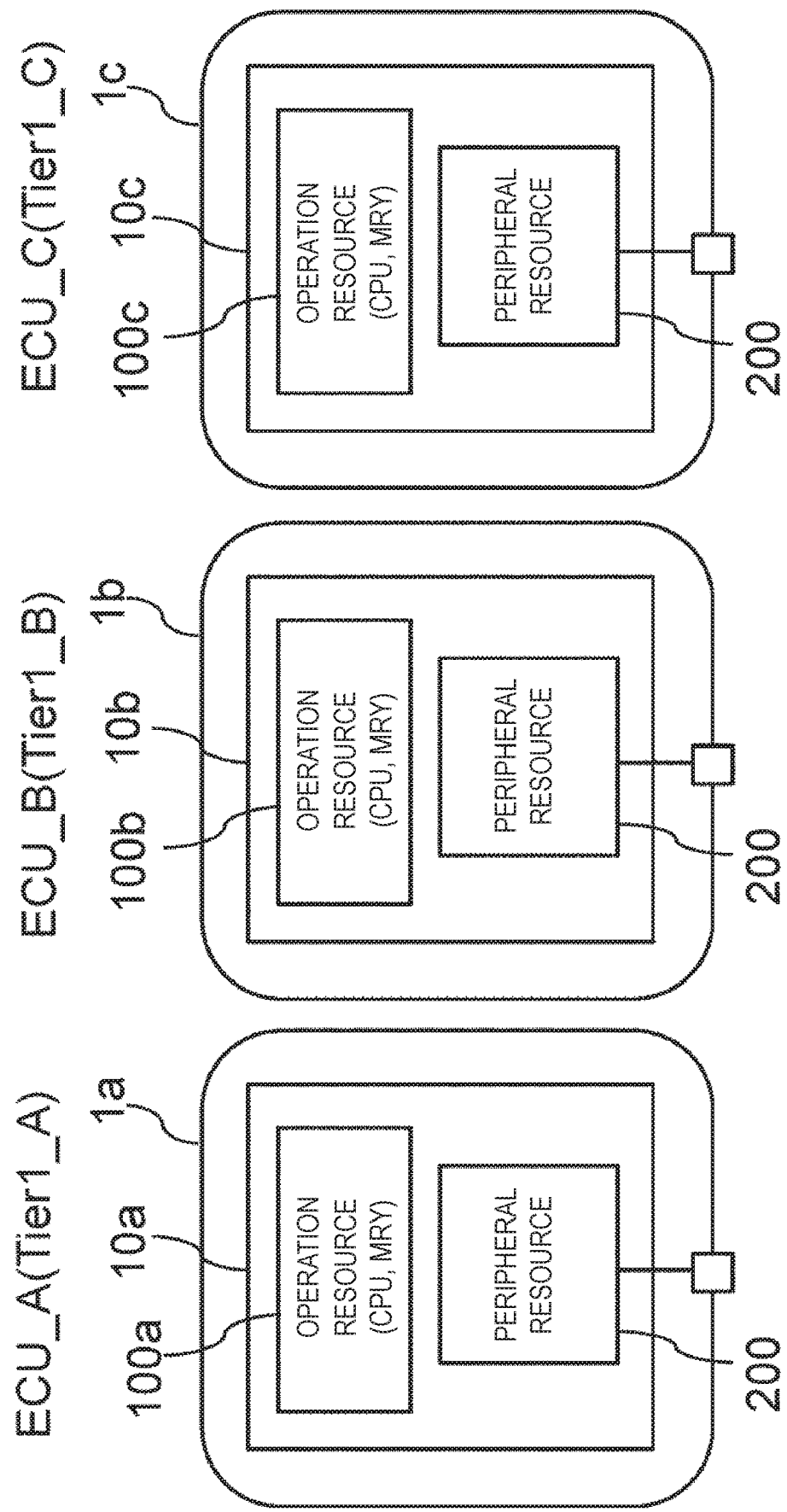
FIG. 1A is a diagram schematically showing a configuration of an ECU before integration.

An embodiment, an example and a modification will be described below with reference to the drawings. However, in the following description, the same components are denoted by the same reference numerals, and a repetitive description thereof may be omitted.

First, a function integration of an ECU will be described with reference to FIGS. 1A and 1B. FIG. 1A is a diagram schematically showing a configuration of an ECU before integration, and FIG. 1B is a diagram schematically showing a configuration of an integrated ECU of a comparative example.

As shown in FIG. 1A, an ECU_A1a, an ECU_B1b, and an ECU_C1c before integration are mainly composed of semiconductor devices 10a, 10b, and 10c, respectively. Each of the semiconductor devices 10a, 10b, and 10c includes operation resources 100a, 100b, and 100c such as Central Processing Units (CPUs) and memories, and peripheral resources 200. The ECU_A1a, the ECU_B1b, and the ECU_C1c are developed and verified by different companies (Tier1_A, Tier1_B, and Tier1_C), respectively. Thereafter, it is assembled by the OEM. At this time, verification of portions relating to the respective connections of the ECU_A1a, the ECU_B1b, and the ECU_C1c is performed, and verification of the function as a whole is completed. This is because independence of the ECU_A1a, the ECU_B1b, and the ECU_C1c is self-evident. When the Tier1_A, the Tier1_B, and the Tier1_C are represented, they are referred to as the Tier1.

Figure 1B:
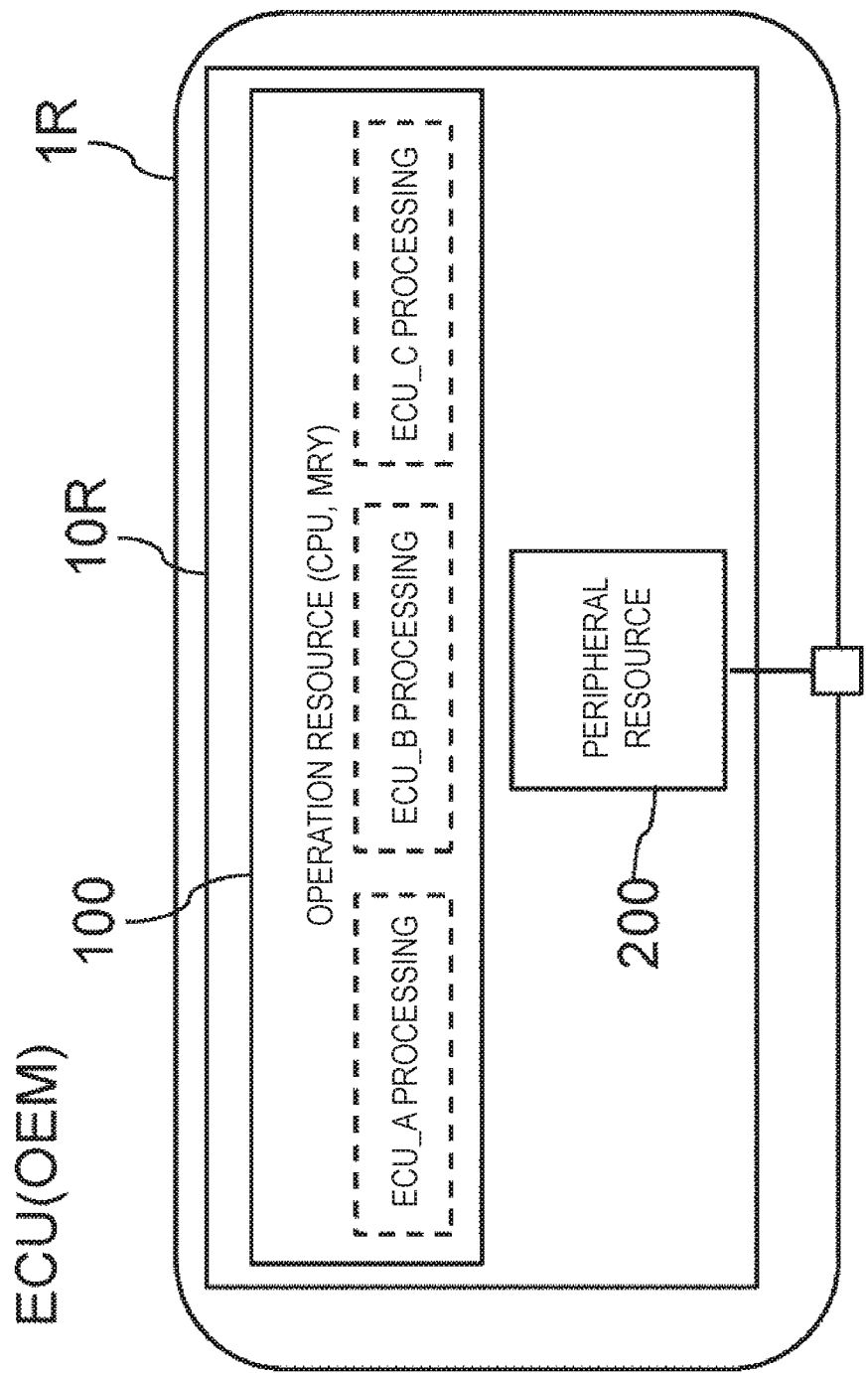
FIG. 1B is a diagram schematically showing a configuration of an integrated ECU of a comparative example.

As shown in FIG. 1B, the integrated ECU 1R of the comparative example is mainly composed of a semiconductor device 10R. The semiconductor device 10R includes an operation resource 100 and a peripheral resource 200 for performing the functions of the ECU_A1a, the ECU_B1b, and the ECU_C1c. For example, the operation resource 100 allocates one CPU and one memory to performance processing of the functions of ECU_A1a, ECU_B1b, and ECU_C1c in a time-division manner, and the peripheral resource 200 is shared. The integrated ECU 1R is developed and verified by the OEM, or any Tier1 of the Tier1_A, the Tier1_B and the Tier1_C, or another Tier1. However, software for realizing the functions of the ECU_A1a, the ECU_B1b and the ECU_C1c is developed and verified in each of Tier1_A, Tier1_B, and Tier1_C.

Figure 2A:
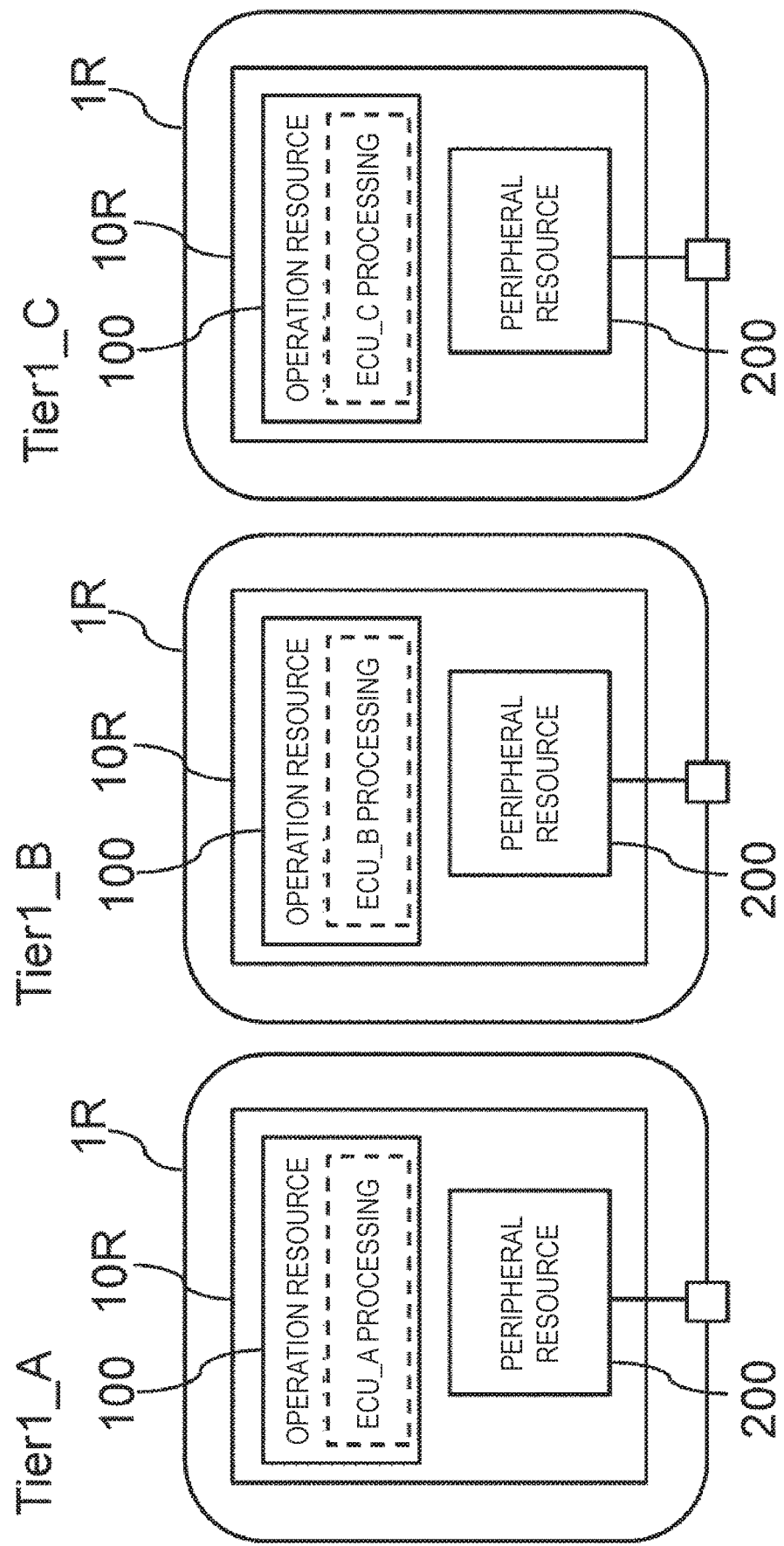
FIG. 2A is a block diagram explaining verification of the integrated ECU of FIG. 1B by the Tier1.
Figure 3:
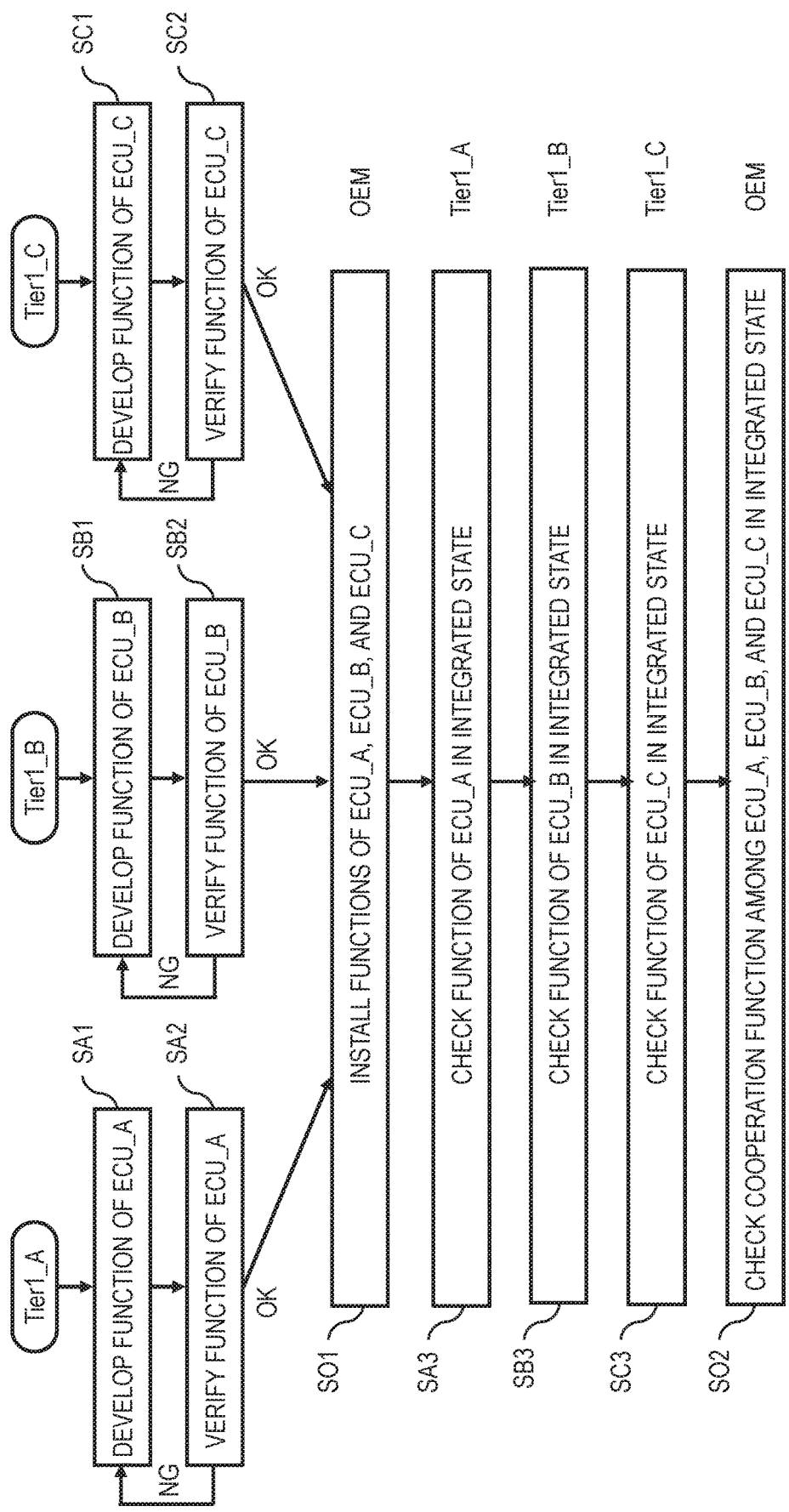
FIG. 3 is a flowchart explaining verification of the integrated ECU of FIG. 1B.

Problems occurring in the integrated ECU 1R of the comparative example will be described with reference to FIGS. 2A, 2B and 3. FIG. 2A is a block diagram explaining verification of the integrated ECU of FIG. 1B by the Tier1, and FIG. 2B is a block diagram explaining verification of the integrated ECU of FIG. 1B by the OEM and the Tier1. FIG. 3 is a flowchart explaining verification of the integrated ECU of FIG. 1B.

Generally, the verification of each single ECU function is often performed by the Tier1 responsible for development of each single ECU function, and the verification in the integrated state is performed by the OEM because of its nature. It is difficult for the OEM to perform the validation that the Tier1 performs. Therefore, the verification of the integrated ECU function is performed at the stage of (1) verification of the function and timing of the single ECU by each Tier1, and (2) verification in the state integrated by a plurality of ECU by the OEM.

As shown in FIGS. 2A and 3, in the verification of the above (1), the Tier1_A, the Tier1_B, and the Tier1_C perform development and check of only software that each is in charge of by using the hardware of the integrated ECU 1R. That is, as shown in FIG. 3, the Tier1_A develops the software for the function of the ECU_A (step SA1), and verifies the software for the function of the ECU_A (step SA2). Similarly, the Tier1_B develops the software for the function of the ECU_B (step SB1), verifies the software for the function of the ECU_B (step SB2), the Tier1_C develops the software for the function of the ECU_C (step SC1), and verifies the software for the function of the ECU_C (step SC2).

As shown in FIGS. 2B and 3, in the verification of the above (2), the OEM installs the software developed by the Tier1_A, the Tier1_B, and the Tier1_C together in the integrated ECU 1R and provided it to each Tier1 (step SO1).

Next, the Tier1_A checks (verifies) the operation of the software for the function of the ECU_A while operating the software for the function of the ECU_A, the software for the function of the ECU B and the software for the function of the ECU_C in parallel (step SA3). Similarly, the Tier1_B checks (verifies) the operation of the software for the function of the ECU_B (step SB3), and the Tier1_C checks (verifies) the operation of the software for the function of ECU_C (step SC3). Finally, the OEM checks the operation in which the ECU_A, the ECU_B and the ECU_C cooperate (step SO2).

The steps SA1, SA2, SB1, SB2, SC1 and SC2 are the same as the design and verification performed by the Tier1 for the ECUs that are not integrated. The steps SO1 and SO2 are the same as the verification performed by the OEM for the ECUs that are not integrated. The steps of SA3, SB3 and SC3 are the validations performed by the Tier1 that are increased by the integration.

This is because of the following reason.

Although the peripheral resource 200 can be occupied in the case of the single ECU function evaluation, when the ECU integration is performed, the peripheral resource 200 is shared by each single ECU function. Therefore, although the verification of the function and timing of the single ECU is performed, the conflict of the peripheral resource 200 occurs, and therefore, it is required to confirm that the same operation as the operation at the time of the single ECU verification is performed even in the environment in which the functions are integrated.

In other words, after the verification is performed alone, it is necessary to re-verify the state in which the functions are integrated.

In order to implement the integrated ECU in which a plurality of ECU functions are integrated, it is essential that the result of the verification performed in the above (1) can be used (the verification in the above (1) is unnecessary) when the verification is performed by integrating the plurality of ECU functions in the above (2). In other words, it is required to perform the verification of the above (1) so that the verification result of the above (1) can be utilized at the time of the verification of the above (2).

Therefore, in the integrated ECU, when the Tier1 verifies the single ECU function, it is required to be able to perform the verification in a condition in which the peripheral resource is shared.

Embodiment

Figure 4:
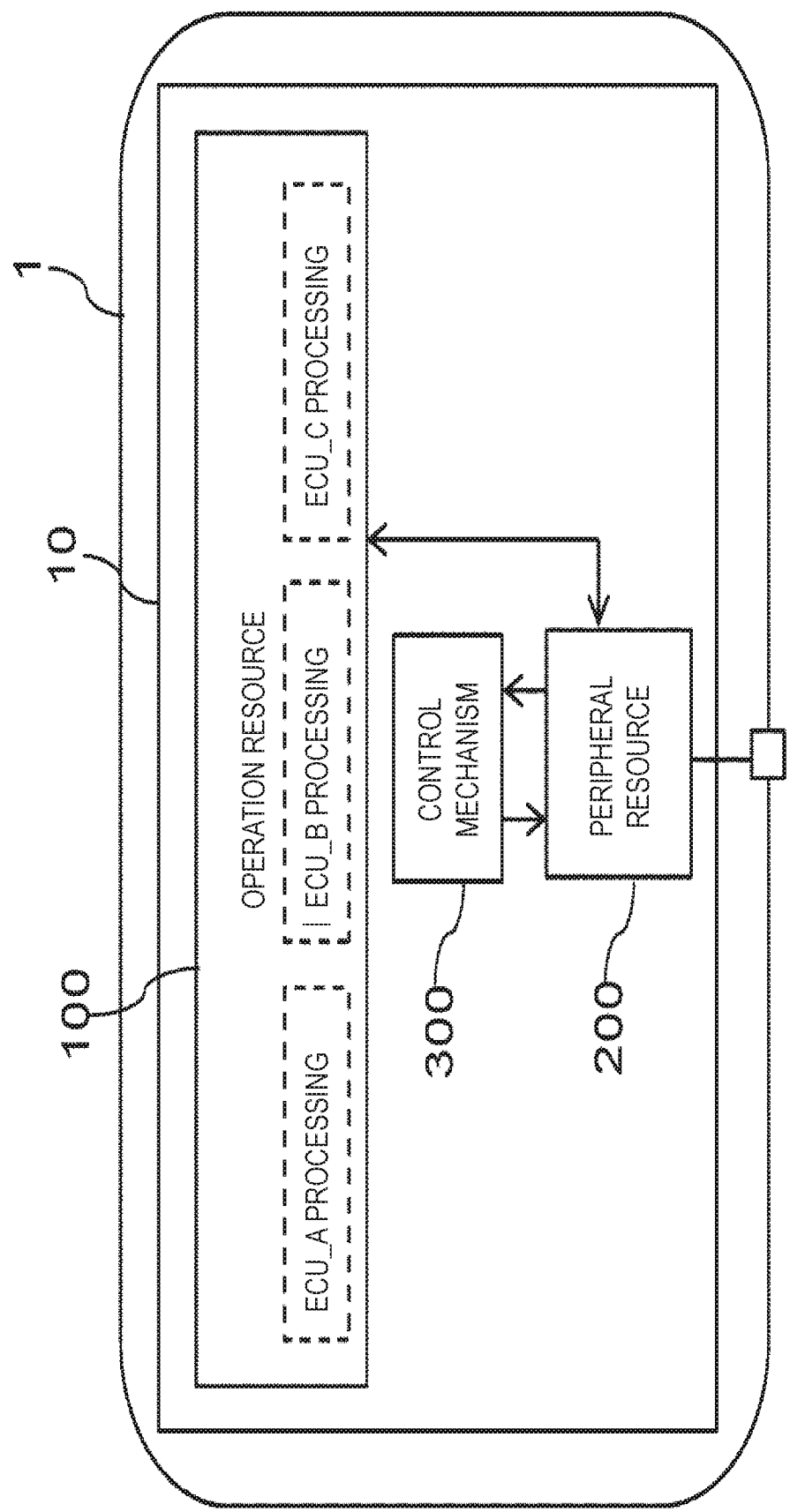
FIG. 4 is a diagram schematically showing a configuration of an integrated ECU according to an embodiment.

An integrated ECU according to an embodiment in which the single ECU_A1a, the single ECU_B1b, and the single ECU_C1c of FIG. 1A are integrated will be described with reference to FIG. 4. FIG. 4 is a diagram schematically showing a configuration of the integrated ECU according to the embodiment.

The integrated ECU 1 according to the embodiment is mainly composed of a semiconductor device 10. The semiconductor device includes an operation resource 100 for performing the functions of the ECU_A1a, the ECU_B1b and the ECU_C1c, a peripheral resource 200, and a control mechanism 300 for controlling the peripheral resource 200. For example, the operation resource 100 allocates one CPU and one memory to processing of the operation resources 100a, 100b and 100c in a time-division manner, and the peripheral resource 200 is shared by the operation resources 100a, 100b, and 100c. Note that the operation resource 100 may be configured by a plurality of CPUs.

Figure 5:
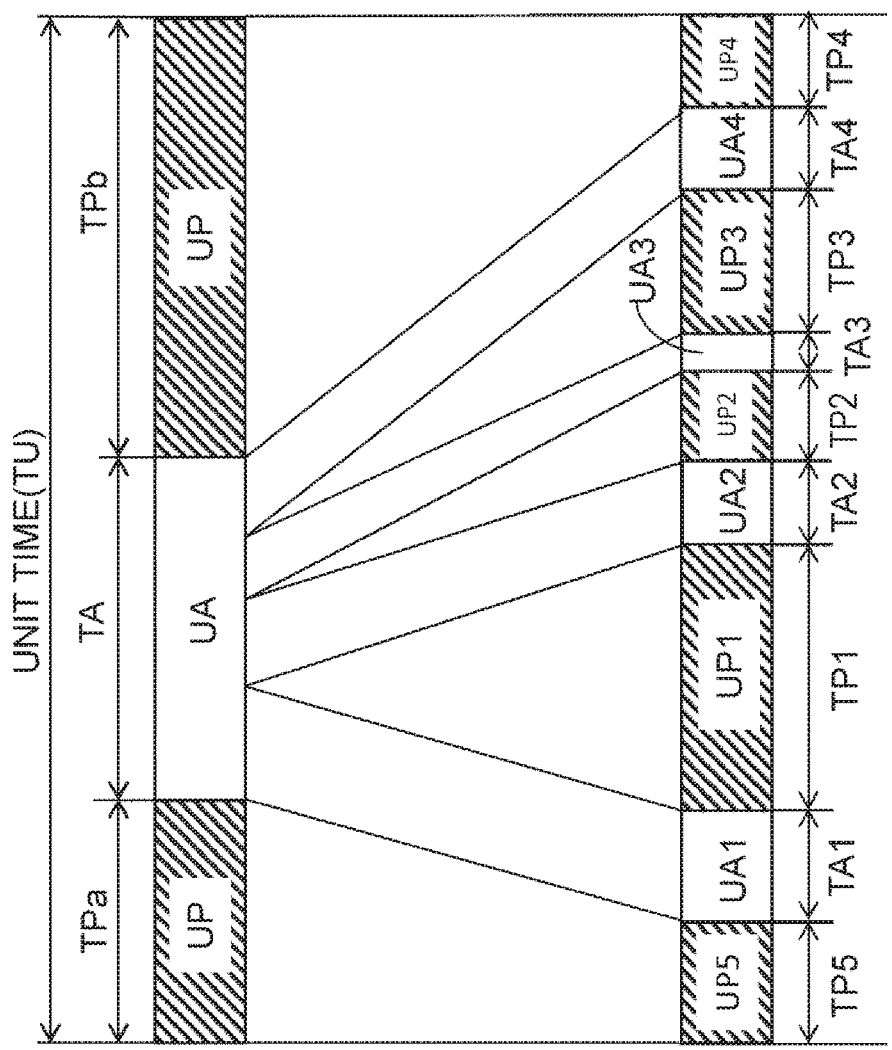
FIG. 5 is a diagram showing a usable period and a use prohibition period within a unit time.

Next, the function of the control mechanism of FIG. 4 will be described with reference to FIG. 5. FIG. 5 is a diagram showing a usable period and a use prohibition period within a unit time.

The control mechanism 300 creates a contended state by sharing the peripheral resource 200 at the time of the single ECU function verification of the above (1).

For example, the control mechanism 300 creates a use prohibition state corresponding to a budget value (BDG) allocated in advance to the shared peripheral resource 200, thereby realizing the verification of the single ECU within the use frequency achieved at the time of integration. A setting of the BDG is determined from restriction requirements for each single ECU (performance allocation of each single ECU). A period during which the peripheral resource 200 is in the use prohibition state is referred to as a use prohibition period UP, and a period during which the peripheral resource 200 is in a usable state is referred to as a usable period UA. Assuming that a time of a unit time (UNIT TIME) is TU, a time of the use prohibition period UP is TP, the first time of the use prohibition period UP is TPa, the second time of the use prohibition period UP is TPb, and a time of the usable period UA is TA, $$TU=TA+TPa+TPb=TA+TP, \text{ and}$$

$$BDG=TA/(TPa+TPb)=TA/TP.$$

Here, when TP=TPa+TPb, TP=TU/(1+BDG).

The time (TP) of the use prohibition period UP and the time (TA) of the usable period UA are determined based on the unit time (TU) and the budget value (BDG). As a result, the control mechanism 300 enables the peripheral resource 200 to be available only in a defined band at the time of the single ECU function evaluation.

Since the peripheral resource 200 may be discretely used within the budget value, it is not consistent with providing only one usable period. Thus, for example, the control mechanism 300 may divide the usable period UA into the first usable period UA1, the second usable period UA2, the third usable period UA3 and the fourth usable period UA4, divide the use prohibition period UP into the first use prohibition period UP1, the second use prohibition period UP2, the third use prohibition period UP3, the fourth use prohibition period UP4 and the fifth usable prohibition period UP5, and cause the usable period UA to be dispersed. Here, when a time of the first usable period UA1 is TA1, a time of the second usable period UA2 is TA2, a time of the third usable period UA3 is TA3, a time of the fourth usable period UA4 is TA4, a time of the first use prohibition period UP1 is TP1, a time of the second use prohibition period UP2 is TP2, a time of the third use prohibition period UP3 is TP3, a time of the fourth use prohibition period UP4 is TP4, and a time of the fifth use prohibition period UP5 is TP5, $$TA=TA1+TA2+TA3+TA4, \text{ and}$$

$$TP=TPa+TPb=TP5+TP1+TP2+TP3+TP4.$$

The use prohibition period is determined, for example, as follows:

(a) The use prohibition period of the peripheral resource 200 is dynamically inserted based on a use time of the peripheral resource 200. The time of the use prohibition period is calculated based on the budget value. This makes it possible to provide the same use rate of the peripheral resource as in the integrated ECU when the single ECU function evaluation is performed.

(b) After the use of the peripheral resource 200, the use prohibition period is set based on the use time, and inserted. Preferably, the use prohibition period (e.g., the first use prohibition period UP1 of the time (TP1)) is set based on an immediately preceding use time (e.g., the time (TA1) of the first usable period UA1), and inserted. As a result, it is possible to provide the single ECU function subject to the verification with an opportunity to discretely use the peripheral resource.

Moreover, the single ECU function may not continuously access the peripheral resource 200 due to the constraint of its own processing content. The state in which this access is not performed is referred to as an inaccessible state, and the period is referred to as an inaccessible period. If there is no use of the peripheral resource 200 other than during the use prohibition period, the period during which such use had not been made may be deducted from the "the use prohibition period" and the inaccessible period potentially possessed by the single ECU function subject to the verification may not be recorded as the use prohibition period. Since the inaccessible period potentially possessed by the single ECU function subject to the verification is not included in the usable period, the inaccessible period potentially possessed by the single ECU function subject to the verification is recorded as the use prohibition period, and therefore, an excessive use prohibition period is not set.

The control mechanism 300 may be configured by hardware or software. The peripheral resource is a circuit for realizing an input or output interface function for a semiconductor device such as Input/Output (I/O) to which a peripheral device such as a communication controller for communicating with another ECU and the like, a sensor, a switch, an actuator and the like is connected, and is a circuit that can be shared by a plurality of ECU functions. In the following example, a case in which the control mechanism 300 according to the embodiment is configured by hardware and a case in which the peripheral resource is a communication controller will be described.

Example

Figure 6:
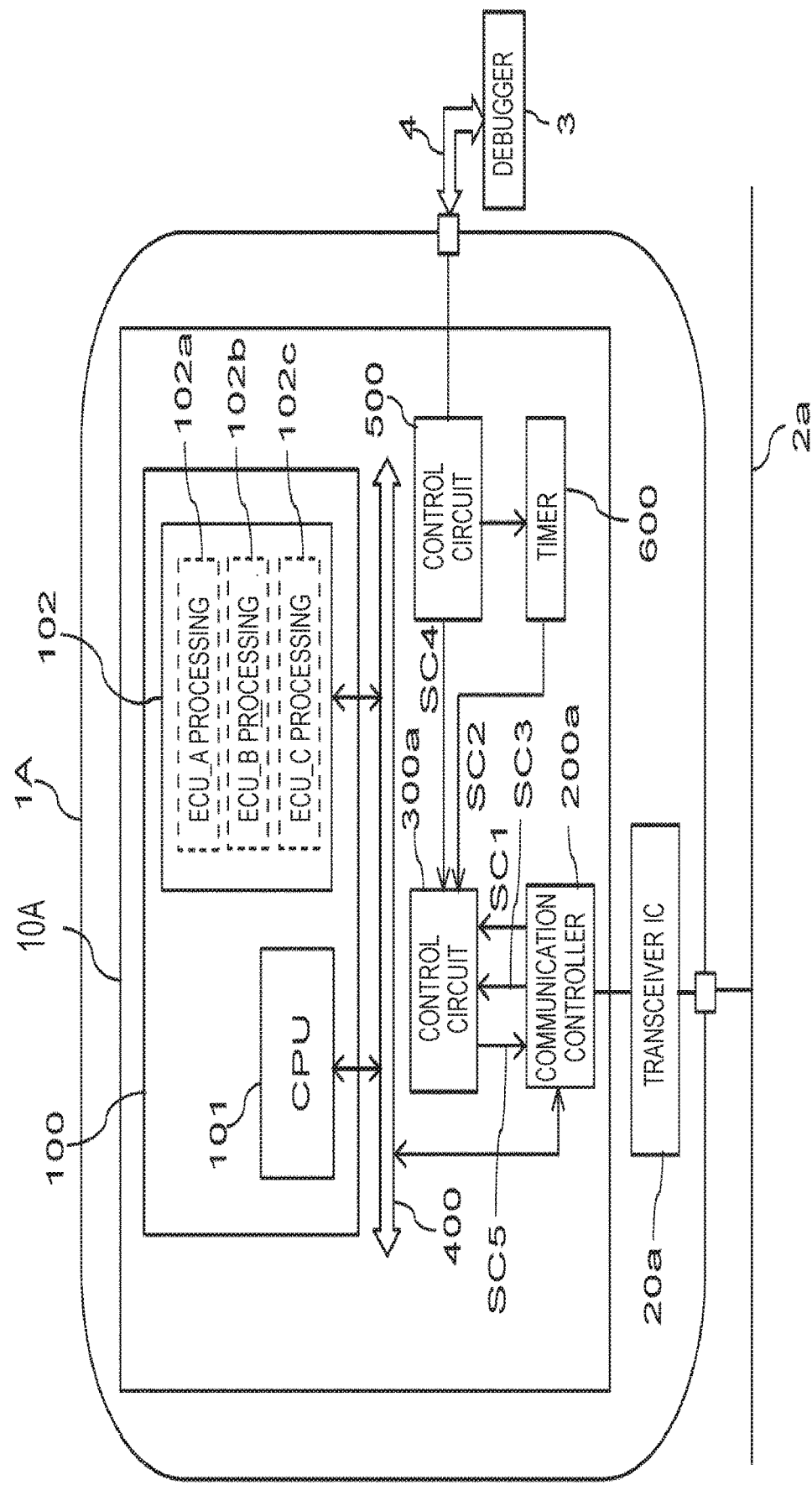
FIG. 6 is a diagram schematically showing a configuration of an integrated ECU of an example.

FIG. 6 is a diagram schematically showing a configuration of an integrated ECU of the example. As shown in FIG. 6, the integrated ECU 1A is connected to a Controller Area Network (CAN) bus 2*a*, which is an in-vehicle network, and can communicate with another ECU and the like. The integrated ECU 1A can be connected to a debugger 3 via a debugger interface (I/F) 4.

The ECU 1A is mainly composed of a semiconductor device 10A, such as a microcontroller or a System-On-Chip (SOC), and a transceiver Integrated Circuit (IC) 20*a*. The semiconductor device 10A includes a CPU 101, a storage unit 102 for storing software programs 102*a*, 102*b*, and 102*c* for realizing each of the single ECU functions, a communication controller (communication peripheral circuit) 200*a* for CAN communication, a control circuit 300*a*, a control circuit 500 and a timer 600. The operation resource 100 is composed of the CPU 101 and the storage unit 102, and the CPU 101 executes the software programs 102*a*, 102*b*, and 102*c* stored in the storage unit 102 in a time-division manner to configure the functions of the ECU_A1*a*, the ECU_B1*b* and the ECU_C1*c*. The communication peripheral circuit 200*a* is shared similarly to the peripheral resource 200 of the embodiment. The operation resource 100 may be composed of a plurality of CPUs. The storage unit 102 includes, for example, a non-volatile memory, such as a flash memory, and a volatile memory, such as a Static Random Access Memory (SRAM).

The single ECU function is performed by the operation resource 100, and communicates an outside of the integrated ECU 1A through the communication peripheral circuit 200*a* as required.

The communication peripheral circuit 200*a* converts a frame of a transmission buffer (not shown) into a serial transmission signal according to a communication protocol of the CAN, and outputs the serial transmission signal to the transceiver IC 20*a*. The transceiver IC 20*a* converts the transmission signal of a logic level obtained from the communication peripheral circuit 200*a* into a corresponding differential voltage and transmits the differential voltage to the CAN bus 2*a*.

At the time of data reception, the transceiver IC 20*a* reads the differential voltage of the CAN bus 2*a*, and outputs a reception signal shaped to be included in a predetermined voltage range to the communication peripheral circuit 200a. A reception terminal of the communication peripheral circuit 200a includes, for example, a comparator, compares a predetermined threshold voltage with the reception signal from the transceiver IC 20a to generate digital data of "1" and "0", and stores the digital data in a reception buffer (not shown).

The control circuit 300a sets the use prohibition period for the communication peripheral circuit 200a, and forms a contention state due to sharing in the communication peripheral circuit 200a. The use prohibition period is set in a state where the following conditions are satisfied.

(I) Considering that allocation to other processes is prioritized immediately after use (II) considering the inaccessible state of the single ECU itself In particular, the control circuit 300a:

(A) notifies the communication peripheral circuit 200a of the use prohibition/usable state, and sets the communication peripheral circuit 200a to the use prohibition state;

(B) calculates the use prohibition state of the communication peripheral circuit 200a by a predetermined constraint (budget value);

(C) sets a period (use prohibition period) of the next use prohibition state by the predetermined constraint (budget value) and a use time of the communication peripheral circuit 200a operated in the past; and (D) removes the inaccessible time for the communication peripheral circuit 200a from the use prohibition period.

The communication peripheral circuit 200a is configured not to output an acknowledge signal in response to an access request signal from the CPU 101, for example, when the use prohibition is notified from the control circuit 300a, and the communication peripheral circuit 200a is configured to output an acknowledge signal when the usable state is notified.

Figure 7:
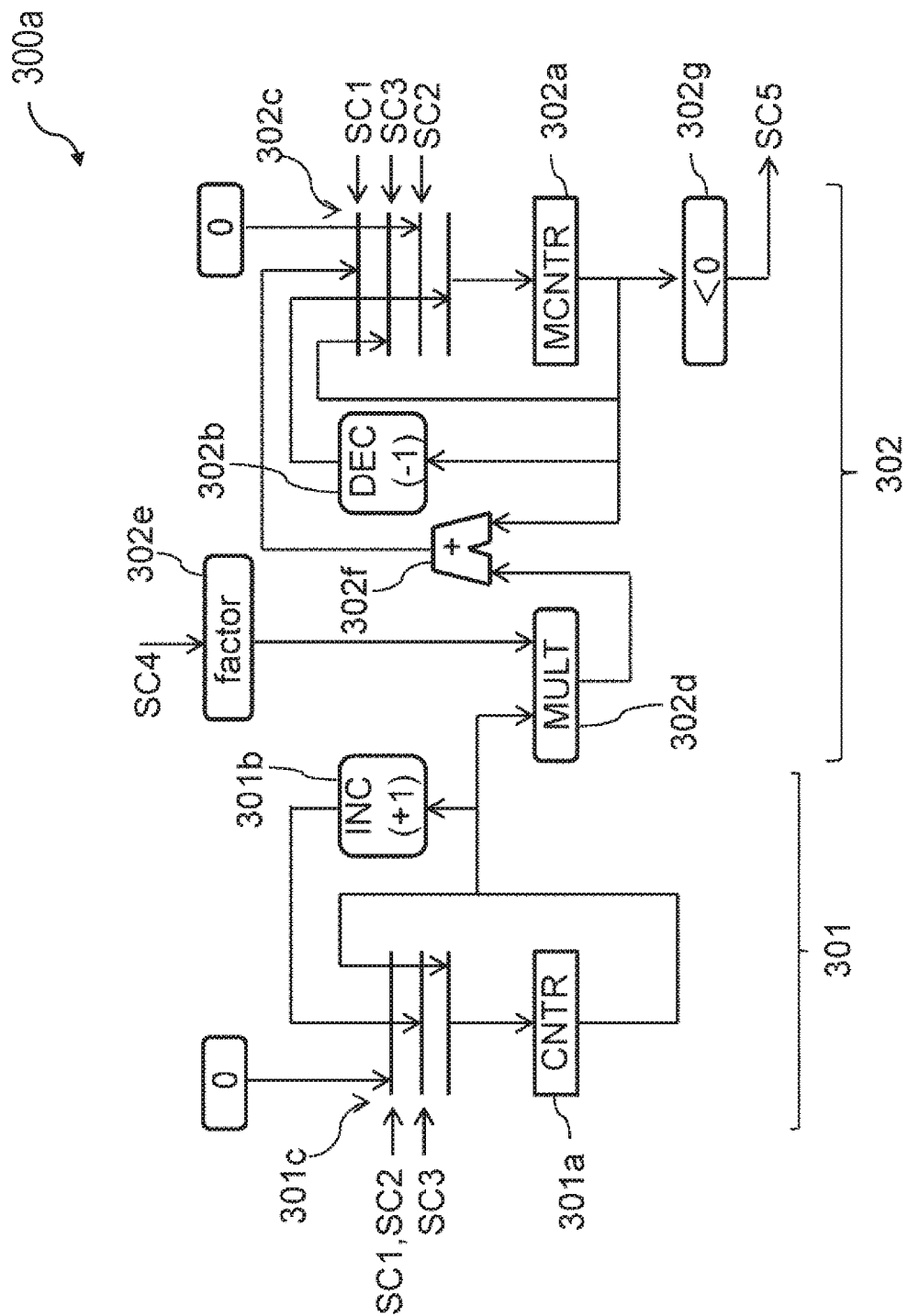
FIG. 7 is a block diagram showing a configuration of the control circuit of FIG. 6.

Next, a configuration of the control circuit 300a will be described with reference to FIG. 7. FIG. 7 is a block diagram showing the configuration of the control circuit 300a of FIG. 6.

The control circuit 300a includes a counter 301 for measuring an operation time of the communication peripheral circuit 200a, and a main counter 302 for determining whether the communication peripheral circuit 200a is available or not. The control circuit 300a:

(i) down-counts the main counter 302 during a period in which the communication peripheral circuit 200a is not used;

(ii) makes the communication peripheral circuit 200a available when a count value of the main counter 302 is negative, and disables the communication peripheral circuit 200a when the count value is positive;

(iii) stops the main counter 302 while the communication peripheral circuit 200a is used; and (iv) after the communication peripheral circuit 200a is used, adds the count value of the main counter 302 in accordance with a use rate.

The counter 301 includes a counter register (CNTR) 301a, an incrementer (INC) 301b and a selector 301c. The counter 301 is initialized by assertion of a transfer end signal (SC1) from the communication peripheral circuit 200a or a reset signal (SC2) from the timer 600. This is performed by the selector 301c selecting "0" by the transfer end signal (SC1) or the reset signal (SC2) and inputting the selected "0" to the counter register (CNTR) 301a. The counter 301 continues to count up while the communication peripheral circuit 200a is operating. This is performed by the selector 301c selecting an output of the incrementer 301b in response to an in-operation signal (SC3) indicating that the communication peripheral circuit 200a is in operation and inputting the selected output of the incrementer 301b to the counter register (CNTR) 301a. As a result, when the transfer end signal (SC1) is generated, the counter 301 indicates an occupied time in which the communication peripheral circuit 200a is used.

The main counter 302 includes a main counter register (MCNTR) 302a, a decrementer (DEC) 302b, a selector 302c, a multiplier 302d, a register 302e, an adder 302f and a negative determiner 302g. The main counter 302 is initialized by the periodic reset signal (SC2). This is performed by the selector 302c selecting "0" by the reset signal (SC2) and inputting the selected "0" to the main counter register (MCNTR) 302a. It is assumed that a cycle of the reset signal (SC2) is a unit time (UNIT TIME) for which the allocated band is to be guaranteed when the communication peripheral circuit 200a is controlled.

The main counter 302 operates as a subtraction counter when the communication peripheral circuit 200a is not operating. This is performed by the selector 302c selecting an output of the decrementer 302b in response to the in-operation signal (SC3) indicating that the communication peripheral circuit 200a is in operation and inputting the selected output of the decrementer 302b to the main counter register (MCNTR) 302a.

When the transfer end signal (SC1) is generated, the main counter 302 uses the multiplier 302d to multiply a value of the counter register (CNTR) 301a by the budget value (SC4) which is a coefficient (factor) set in advance in the register 302e by the control circuit 500, and adds the operation result to a value of the main counter register (MCNTR) 302a using the adder 302f. This is performed by the selector 302c selecting an output of the adder 302f in response to the transfer end signal (SC1) and inputting the selected output of the adder 302f to the main counter register (MCNTR) 302a.

The negative determiner (<0) 302g determines whether the value of the main counter register (MCNTR) 302a is negative, and outputs an usable signal (SC5) to the communication peripheral circuit 200a. If the negative determiner 302g determines the value of the main counter register (MCNTR) 302a is negative, the usable signal (SC5) is asserted and the communication peripheral circuit 200a is available. If the negative determiner 302g determines the value of the main counter register (MCNTR) 302a is positive (is not negative), the usable signal (SC5) is negated and the communication peripheral circuit 200a is unavailable. The negative determiner 302g determines whether the value of the main counter register (MCNTR) 302a is negative, depending on whether the most significant bit of the main counter register (MCNTR) 302a is "1", for example.

As shown in FIG. 6, the budget value and the unit time (cycle) are set from the debugger 3 to the control circuit 300a via the debugger I/F 4. The settings are indicated by the OEM to the respective Tier1 with static values. The control circuit 500 sets the budget value (SC4) set by the debugger 3 in the register 302e of the control circuit 300a. The control circuit 500 sets the unit time set by the debugger 3 to the timer 600. The timer 600 generates the reset signal (SC1) every unit time.

Note that the control circuit 300a, the control circuit 500, the timer 600 and the debugger 3 are used only at the time of the unit ECU function evaluation by the Tier1, and are not used at the time of evaluation by the OEM or after mass production and shipping.

Figure 8:
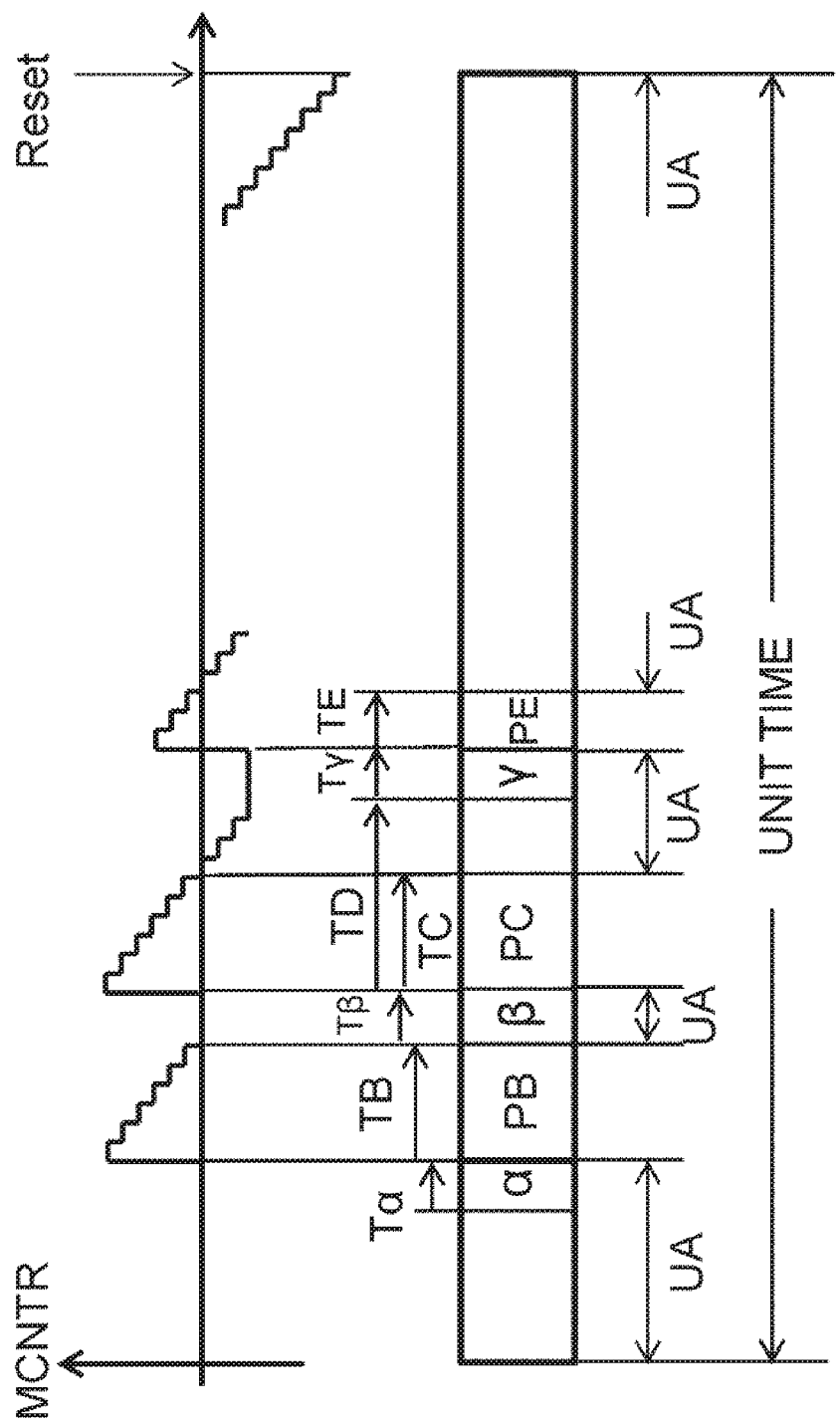
FIG. 8 is a diagram explaining an operation of a control circuit of FIG. 6.
Figure 9:
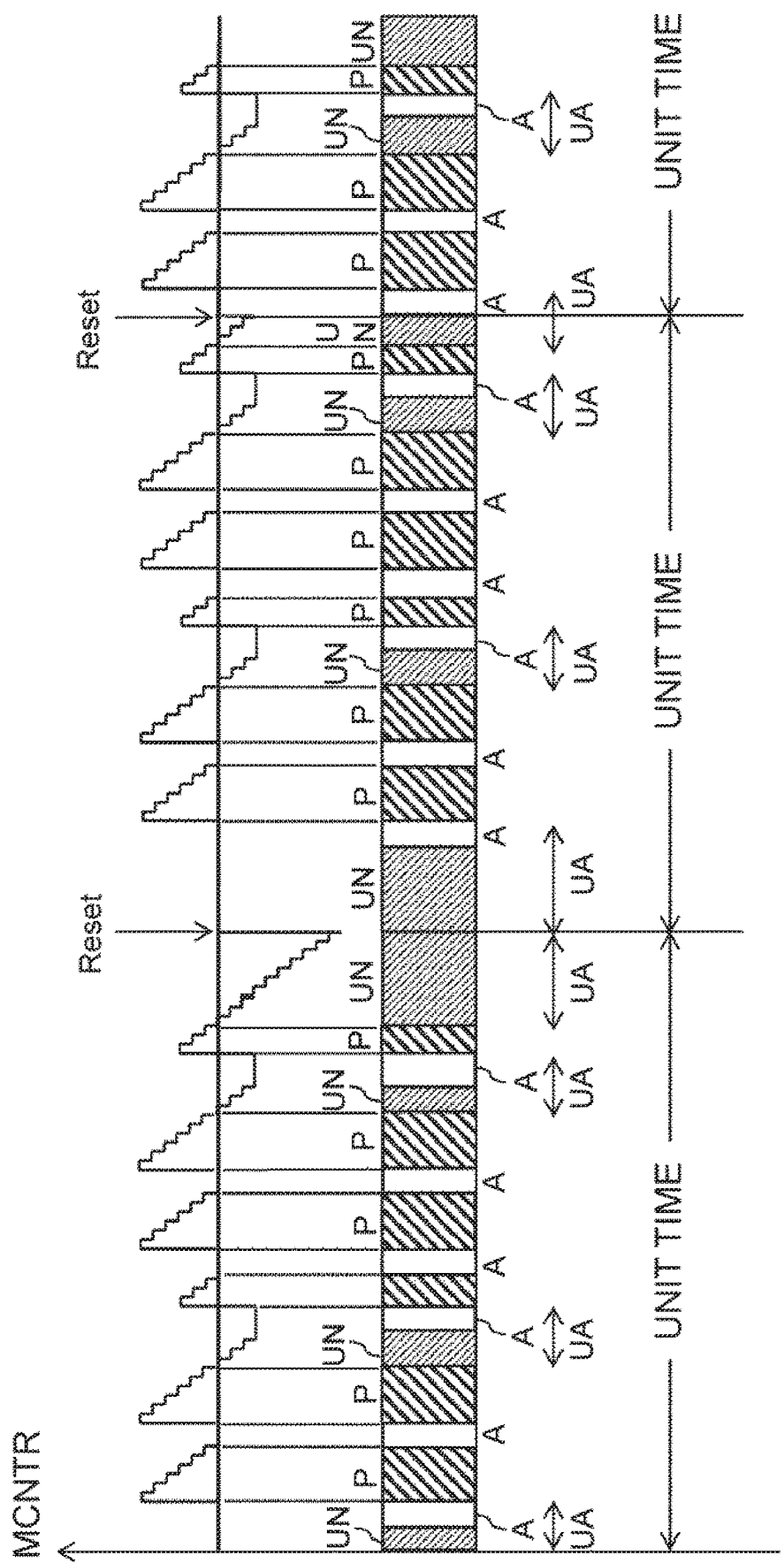
FIG. 9 is a diagram explaining the operation of the control circuit of FIG. 6 in a plurality of unit times.

Next, an operation of the control circuit 300a will be described in detail with reference to FIGS. 8 and 9. FIG. 8 is a diagram for explaining the operation of the control circuit 300a of FIG. 6. FIG. 9 is a diagram for explaining the operation of the control circuit 300a of FIG. 6 in a plurality of unit times. FIG. 8 shows an example in which the use (access request) α, β, and γ of the communication peripheral circuit 200a occurs within the unit time (UNIT TIME).

Although a usable period UA is set at the beginning of the unit time, the CPU 101 is unavailable to the communication peripheral circuit 200a, and after becoming available, an initial access request α is generated. It is assumed that a time taken to use the communication peripheral circuit 200a for the access request α is Tα.

A use prohibition period PB for the communication peripheral circuit 200a is set by the transfer end event signal (SC1) from the communication peripheral circuit 200a, and the main counter 302 starts to subtract.

While the value of the main counter register (MCNTR) 302a takes a positive value, the communication peripheral circuit 200a is disabled, and the use of the communication peripheral circuit 200a of the access request β generated until the value of the main counter register (MCNTR) 302a shows a negative number waits until the value of the main counter register (MCNTR) 302a becomes negative.

A time (TB) of the use prohibition period PB of the communication peripheral circuit 200a is derived from the time (Ta) taken for the processing at the time of the immediately preceding use for the communication peripheral circuit 200a. If the use allocation (coefficient (factor)) of the communication peripheral circuit 200a to the single ECU function to be targeted is K %, the value of TB is derived from a time obtained by multiplying Ta by (100−K)/K. For example, when K=25, TB=3×Tα.

When the value of the main counter register (MCNTR) 302a becomes a negative value, the communication peripheral circuit 200a becomes available, and the use of the communication peripheral circuit 200a for the access request β starts.

A time required for the use of the communication peripheral circuit 200a for the access request β is counted by the counter 301. During this time, the main counter 302 is not decremented and the values of the main counter register (MCNTR) 302a remain unchanged.

A time (TC) of a use prohibition period PC of the communication peripheral circuit 200a is calculated again from the time (Tβ) taken by the use of the communication peripheral circuit 200a for the access request β, and is added to the main counter register (MCNTR) 302a. The main counter 302 starts and continues the subtraction count process.

Although the usable period UA is set after the time (TC) of the use prohibition period PC has elapsed, the main counter 302 continues decrementing because there is no subsequent access request to the communication peripheral circuit 200a.

If the access request y occurs after the elapse of a TD time (longer than the TC time) from the previous access request the access request y can immediately start the use of the communication peripheral circuit 200a. This is because the value of the main counter register (MCNTR) 302a indicates a negative number.

After the use of the communication peripheral circuit 200a for the access request y is completed, a time (TE) of a use prohibition period PE recalculated from the use of the communication peripheral circuit 200a for the access request y is calculated, and is added to the main counter register (MCNTR) 302a. Since the time (TE) of the use prohibition period PE calculated from the time (Ty) taken by the use of the communication peripheral circuit 200a for the access request y is added to the main counter register (MCNTR) 302a which is a negative number, the use prohibition period PE of the communication peripheral circuit 200a determined from the main counter register (MCNTR) 302a is the time (TE) obtained by subtracting a difference between the past time (TD) and the time (TC). The subsequent access request to the communication peripheral circuit 200a can be issued after the use prohibition period PE in which the above correction is performed has elapsed.

As shown in FIG. 9, the main counter 302 is initialized by the reset signal (SC2) regardless of the state of the main counter 302 after the elapse of the minimum unit time (UNIT TIME) for which the band guarantee of the communication peripheral circuit 200a is to be established. In the first unit time in FIG. 9, an inaccessible period UN, a use period A, a use prohibition period P, . . . , and an inaccessible period UN are set, and though the main counter register (MCNTR) 302a takes a negative number, the reset signal after the elapse of the unit time is inputted during the inaccessible period UN. Here, the usable period UA includes the use period A and the inaccessible period UN. At the beginning of the second unit time, the inaccessible period UN of the first unit time continues. The reset signal after the elapse of the second unit time is also input during the inaccessible period UN. However, at the beginning of the third unit time, the use period A is set. The control circuit 300a initializes the main counter 302 every time a unit time elapses, and suppresses the occurrence of an access exceeding the budget allocation within the unit time.

Figure 10:
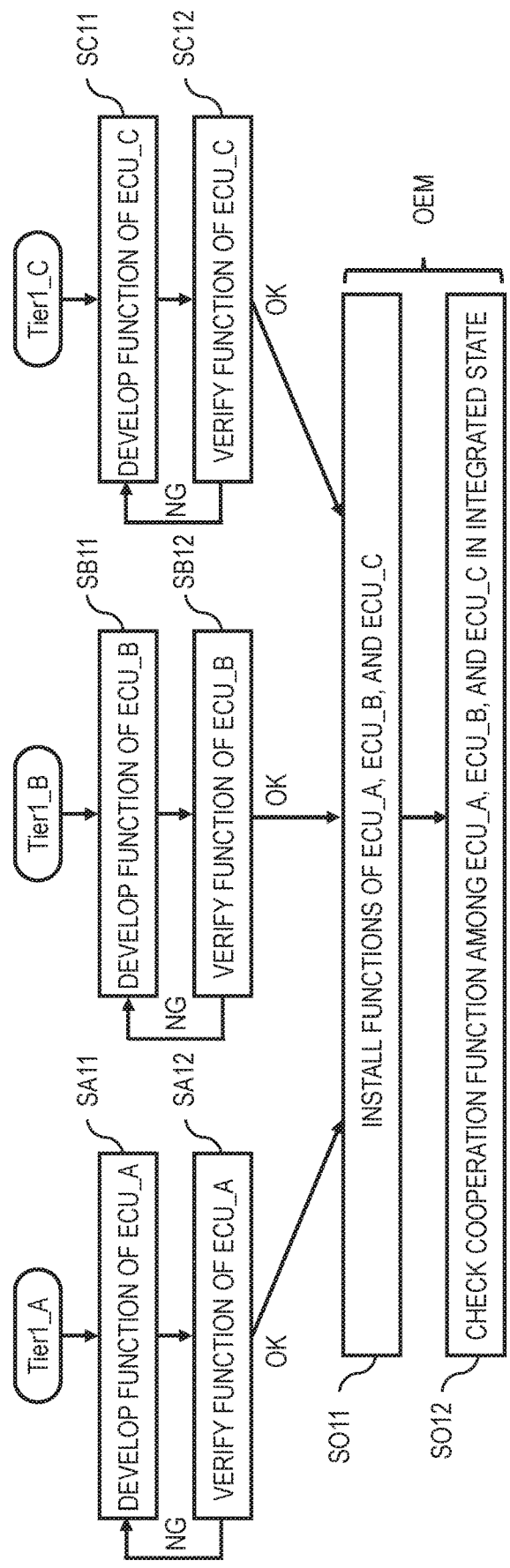
FIG. 10 is a flowchart explaining a manufacturing method of the integrated ECU of FIG. 6.

FIG. 10 is a flowchart explaining a manufacturing method of the integrated ECU 1A of FIG. 6. The OEM develops and manufactures hardware of the integrated ECU 1A. The semiconductor device 10A in the integrated ECU 1A is manufactured by, for example, a semiconductor manufacturer or the like. Using the hardware of the integrated ECU 1A lent from the OEM, the Tier1_A, the Tier1_B and the Tier1_C perform development and operation check of only the software that each is in charge of. That is, as shown in FIG. 10, the Tier1_A develops the software for the function of the ECU_A (step SA11), verifies the software for the function of the ECU_A (step SA12), and delivers the software to the OEM. Similarly, the Tier1_B develops the software for the function of the ECU_B (step SB11), verifies the software for the function of the ECU_B (step SB12), and delivers the software to the OEM. The Tier 1_C develops the software for the function of the ECU_C (step SC11), verifies the software for the function of the ECU_C (step SC12), and delivers the software to the OEM. The respective Tier1 can verify the function of the single ECU in the integrated state.

As shown in FIG. 10, the OEMs install the software developed and verified by Tier1_A, Tier1_B, and Tier1_C in the integrated ECU1 (step SO11). The OEM checks the operation of the ECU_A/ECU_B/ECU_C in cooperation with the ECU_A/ECU_B/ECU_C while operating the ECU_A, ECU_B, and ECU_C functions in parallel (step SO12). Note that the step SA3,SB3,SC3 of FIG. 3 by the Tier1 is not necessary between the step SO11 and the step SO12.

In this example, in the semiconductor provided for the integrated ECU, the "control mechanism" for providing a certain "use prohibition period" to the communication peripheral circuit is mounted.

Further, the "use prohibition period" is determined in accordance with the past occupied time of the communication peripheral circuit as a target and the "band allocation" which is determined prior to the single ECU function evaluation. This function ensures that even in the integrated ECU, the processing within the "band" expected at the time of the integrated ECU is completed.

Further, since the use prohibition period is set in cooperation with the immediately preceding use time of the communication peripheral circuit, the insertion of the use prohibition period is performed at discrete timing. It is possible to realize the single ECU evaluation while avoiding the use prohibition state of the communication peripheral circuit for a long period of time.

By subtracting the potential inaccessible period of the single ECU function from the "use prohibition period" set by the control circuit, it is avoided that the use prohibition period is set excessively. This is because, when operating as the integrated ECU, accesses from other single ECU functions can be executed even during the "use prohibition period" of the single ECU function.

Modification

Several exemplary modifications will be illustrated below. In the following explanation of the modification, the same reference numerals as those of the above-mentioned example may be used for components having the same structures and functions as those described in the above-mentioned example. In the description of such portions, the description in the above-mentioned example can be appropriately incorporated within the scope not inconsistent with the technical aspects. In addition, a part of the above-mentioned example and all or a part of a plurality of modifications may be applied in combination as appropriate within the scope not inconsistent with the technical aspects.

In the example, the communication controller (communication peripheral circuit) for CAN communication is exemplified as the peripheral resource, but the communication peripheral circuit may be a circuit for FlexRay communication, Local Interconnect Network (LIN) communication, Ethernet communication, or the like. The number of peripheral resources is not limited to one, and a plurality of peripheral resources may be used. Hereinafter, a case (modification) including two communication peripheral circuits of a communication controller for CAN communication and a communication controller for Ethernet communication will be described with reference to FIG. 11.

FIG. 11 is a diagram schematically showing a configuration of an integrated ECU of a modification.

As shown in FIG. 11, the integrated ECU 1B is connected to two in-vehicle network lines, i.e., a CAN bus 2a and an Ethernet bus 2b, which are in-vehicle networks, and can communicate with another ECU and the like. The integrated ECU 1B mainly is composed a semiconductor device 10B, such as a microcontroller or an SOC and transceiver ICs 20a and 20b. The semiconductor device 10B includes a CPU 101, a storage unit 102 storing software programs 102a, 102b, and 102c for realizing each single ECU function, a communication controller (communication peripheral circuit) 200a for CAN communication, a communication controller (communication peripheral circuit) 200b for Ethernet communication and control circuits 300a and 300b in one semiconductor chip. The operation resource 100 is composed of the CPU 101 and the storage unit 102, and the CPU 101 executes the software programs 102a, 102b, and 102c stored in the storage unit 102 in a time-division manner to configure the functions of the ECU_A1a, the ECU_B1, and the EC_1c. The communication peripheral circuits 200a and 200b are shared similarly to the peripheral resource 200 of the embodiment. The operation resource 100 may be composed of a plurality of CPUs. The storage unit 102 includes, for example, a non-volatile memory, such as a flash memory, and a volatile memory, such as SRAM.

The single ECU function is performed by the operation resource 100, and communicates to an outside of the integrated ECU 1B through the communication peripheral circuits 200a and 200b as required.

Although the invention made by the present inventor has been specifically described based on the embodiment, example and modification, it is needless to say that the present invention is not limited to the above-described embodiment, example and modification, and can be variously modified.

For example, in the embodiment, example and modification, the case in which three single ECU functions are integrated has been described, but the present invention is not limited to this, and can be applied to a case in which two or more single ECU functions are integrated.

What is claimed is:

1. A semiconductor device comprising:
   an operation resource configured to perform a plurality of Electronic Control Unit (ECU) functions in a vehicle;
   a peripheral resource configured to be shared by the plurality of ECU functions; and
   a control mechanism configured to control a period in which one of the ECU functions uses the peripheral resource,
   wherein the control mechanism is configured to calculate, based on a budget value which is given in advance and is a performance allocation, a use prohibition period in which the one of the ECU functions is prohibited from using the peripheral resource within a predetermined unit time
   wherein the control mechanism is configured to calculate the use prohibition period based on an immediately preceding use time of the peripheral resource after the one of the ECU functions uses the peripheral resource, and
   wherein, when there is a period in which the peripheral resource is not used by the one of the ECU functions in a period other than the use prohibition period, the control mechanism is configured to subtract the period in which the peripheral resource is not used by the one of the ECU functions from the use prohibition period.

2. The semiconductor device according to claim 1, wherein the control mechanism comprises:
   a first counter configured to measure the use time in which one of the ECU functions uses the peripheral resource; and
   a second counter configured to determine availability and non-availability of the peripheral resource by the one of the ECU functions,
   wherein the control mechanism is configured to:
      add a value based on the budget value and a count value of the first counter to a count value of the second counter;
      decrease the count value of the second counter based on the period in which the peripheral resource is not used by the one of the ECU functions;
      if the count value of the second counter is positive, prohibit the one of the ECU functions from using the peripheral resource;
      if the count value of the second counter is negative, allow the one of the ECU functions to use the peripheral resource; and while the one of the ECU functions is using the peripheral resource, stop a counting operation of the second counter.

3. The semiconductor device according to claim 2, wherein the control mechanism further comprises:
a timer configured to count the predetermined unit time, and to generate a signal for initializing the count value of the first counter and the count value of the second counter; and
a control circuit configured to receive the budget value and the predetermined unit time from an outside.

4. The semiconductor device according to claim 3, wherein the operation resource comprises a memory which stores a software program and a Central Processing Unit (CPU) which executes the software program,
wherein the ECU functions are performed by the CPU executing the software program, and
wherein the peripheral resource comprises a communication peripheral circuit.

5. An ECU comprising:
the semiconductor device according to claim 4; and
a transceiver integrated circuit coupled to an in-vehicle network line and the communication peripheral circuit.

6. The semiconductor device according to claim 1, wherein the peripheral resource comprises a first peripheral resource,
wherein the control mechanism comprises a first control mechanism,
wherein the budget value comprises a first budget value,
wherein the use prohibition period comprises a first use prohibition period,
wherein the semiconductor device further comprises:
a second peripheral resource configured to be shared by the plurality of ECU functions; and
a second control mechanism configured to control a period in which one of the ECU functions uses the second peripheral resource,
wherein the second control mechanism is configured to calculate, based on a second budget value which is given in advance and is a performance allocation, a second use prohibition period in which the one of the ECU functions is prohibited from using the second peripheral resource within a predetermined unit time.

7. A verification method of an Electronic Control Unit (ECU), comprising:
providing the ECU which comprises a semiconductor device which includes an operation resource which performs a plurality of ECU functions in a vehicle, a peripheral resource which is shared by the plurality of ECU functions, and a control mechanism which controls a period in which one of the ECU functions uses the peripheral resource by calculating, based on a budget value which is given in advance and is a performance allocation, a use prohibition period in which the one of the ECU functions is prohibited from using the peripheral resource within a predetermined unit time;
developing a software program for realizing the one of the ECU functions to incorporate the software program into the ECU; and
operating the ECU to verify the software program,
wherein the control mechanism is configured to calculate the use prohibition period based on an immediately preceding use time of the peripheral resource after the one of the ECU functions uses the peripheral resource, and
wherein, when there is a period in which the peripheral resource is not used by the one of the ECU functions in a period other than the use prohibition period, the control mechanism is configured to subtract the period in which the peripheral resource is not used by the one of the ECU functions from the use prohibition period.

8. A manufacturing method of an Electronic Control Unit (ECU), comprising:
providing the ECU which comprises a semiconductor device which includes an operation resource which performs a plurality of ECU functions in a vehicle, a peripheral resource which is shared by the plurality of ECU functions, and a control mechanism which controls a period in which one of the ECU functions uses the peripheral resource by calculating, based on a budget value which is given in advance and is a performance allocation, a use prohibition period in which the one of the ECU functions is prohibited from using the peripheral resource within a predetermined unit time;
providing a first software program verified by operating the ECU into which the first software program for realizing one of the plurality of ECU functions is incorporated;
providing a second software program verified by operating the ECU into which the second software program for realizing another one of the plurality of ECU functions is incorporated; and
incorporating the first and second software programs into the ECU to verify a cooperation function between the first and second software programs,
wherein the control mechanism is configured to calculate the use prohibition period based on an immediately preceding use time of the peripheral resource after the one of the ECU functions uses the peripheral resource, and
wherein, when there is a period in which the peripheral resource is not used by the one of the ECU functions in a period other than the use prohibition period, the control mechanism is configured to subtract the period in which the peripheral resource is not used by the one of the ECU functions from the use prohibition period.

* * * * *